(12) United States Patent
Yu et al.

(10) Patent No.: US 11,677,598 B2
(45) Date of Patent: *Jun. 13, 2023

(54) FRAME TRANSMITTING METHOD AND FRAME RECEIVING METHOD

(71) Applicant: ATLAS GLOBAL TECHNOLOGIES LLC, Austin, TX (US)

(72) Inventors: Heejung Yu, Daegu (KR); Minho Cheong, Lake Forest, CA (US); Hyoung Jin Kwon, Lake Forest, CA (US)

(73) Assignee: ATLAS GLOBAL TECHNOLOGIES LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/170,538

(22) Filed: Feb. 8, 2021

(65) Prior Publication Data
US 2021/0167995 A1 Jun. 3, 2021

Related U.S. Application Data

(63) Continuation of application No. 16/440,635, filed on Jun. 13, 2019, now Pat. No. 10,944,593, which is a
(Continued)

(30) Foreign Application Priority Data

Apr. 2, 2015 (KR) .......................... 10-2015-0047099

(51) Int. Cl.
*H04L 25/02* (2006.01)
*H04L 27/26* (2006.01)
(Continued)

(52) U.S. Cl.
CPC ....... *H04L 27/2602* (2013.01); *H04B 7/0452* (2013.01); *H04L 5/005* (2013.01);
(Continued)

(58) Field of Classification Search
CPC .... H04W 74/002; H04W 84/12; H04L 5/005; H04L 27/2603; H04L 27/2602;
(Continued)

(56) References Cited

U.S. PATENT DOCUMENTS 8,270,435 B2 * 9/2012 Olszewski ............ H04L 5/0037
370/468
8,340,032 B2 * 12/2012 Choi ..................... H04L 1/0015
370/278
(Continued)

OTHER PUBLICATIONS

Part 11: Wireless LAN Medium Access Control (MAC) and Physical Layer (PHY) Specifications, IEEE Standards 802.11, (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Man U Phan

(57) ABSTRACT

A method of transmitting a frame is provided by a device in a WLAN. The device sets as additional data subcarriers some of subcarriers which are not set as data subcarriers in at least part of fields included in a frame of a legacy frame format, and allocates information to the additional data subcarriers.

20 Claims, 19 Drawing Sheets

Related U.S. Application Data continuation of application No. 15/626,966, filed on Jun. 19, 2017, now Pat. No. 10,326,618, which is a continuation of application No. 14/684,117, filed on Apr. 10, 2015, now Pat. No. 9,712,342.

(60) Provisional application No. 61/978,776, filed on Apr. 11, 2014.

(51) Int. Cl.
| | |
|---|---|
| *H04L 25/03* | (2006.01) |
| *H04B 7/0452* | (2017.01) |
| *H04L 5/00* | (2006.01) |
| *H04B 7/04* | (2017.01) |
| *H04W 84/12* | (2009.01) |
| *H04W 74/00* | (2009.01) |

(52) U.S. Cl.
CPC .... *H04L 25/0202* (2013.01); *H04L 25/03866* (2013.01); *H04L 27/2603* (2021.01); *H04L 27/2613* (2013.01); *H04B 7/04* (2013.01); *H04W 74/002* (2013.01); *H04W 84/12* (2013.01)

(58) Field of Classification Search
CPC . H04L 1/0003; H04L 1/0009; H04L 25/0202; H04L 5/0007; H04L 25/03866; H04L 25/0226; H04L 27/2613; H04L 25/02; H04L 25/03; H04B 7/04; H04B 7/0452
USPC .......................................................... 370/329
See application file for complete search history.

(56) References Cited

U.S. PATENT DOCUMENTS

| | | | |
|---|---|---|---|
| 8,831,119 B2* | 9/2014 | Kang | H04L 27/2613 |
| | | | 375/220 |
| 9,071,491 B2* | 6/2015 | Lee | H04L 27/28 |
| 9,179,351 B2* | 11/2015 | Kang | H04L 5/0023 |
| 9,300,512 B2* | 3/2016 | Lee | H04B 7/06 |
| 9,628,310 B2* | 4/2017 | Lee | H04W 28/065 |
| 9,712,342 B2* | 7/2017 | Yu | H04B 7/0452 |
| 9,893,790 B2* | 2/2018 | Moon | H04B 7/0452 |
| 10,003,432 B2* | 6/2018 | Srinivasa | H04L 1/0005 |
| 10,034,236 B2* | 7/2018 | Choi | H04L 27/2613 |
| 10,057,899 B2* | 8/2018 | Lee | H04L 25/02 |
| 10,327,172 B2* | 6/2019 | Lee | H04W 28/065 |

OTHER PUBLICATIONS

Part 11: Wireless LAN Medium Access Control (MAC) and Physical Layer (PHY) Specifications, Amendment 4: Enhancements for Very High Throughput for Operation in Bands below 6 GHz, IEEE Standards 802.11ac, 2013, pp. 1-395, IEEE (The Institute of Electrical and Electronic Engineers, Inc.), New York, NY, USA.

Part 11: Wireless LAN Medium Access Control (MAC) and Physical Layer (PHY) Specifications, Amendment 2: Sub 1 GHz License Exempt Operation, IEEE P802.11ah/D5.0, Mar. 2015, pp. 1-604, IEEE (The Institute of Electrical and Electronic Engineers, Inc.), New York, NY, USA.

* cited by examiner

FIG. 7

| SC idx | Object |
|---|---|
| -32 | Guard |
| -31 | Guard |
| -30 | Guard |
| -29 | Guard |
| -28 | Guard |
| -27 | Guard |
| -26 | |
| -25 | |
| -24 | |
| -23 | |
| -22 | |
| -21 | Pilot |
| -20 | |
| -19 | |
| -18 | |
| -17 | |
| -16 | |
| -15 | |
| -14 | |
| -13 | |
| -12 | |
| -11 | |
| -10 | |
| -9 | |
| -8 | |
| -7 | Pilot |
| -6 | |
| -5 | |
| -4 | |
| -3 | |
| -2 | |
| -1 | |

| SC idx | Object |
|---|---|
| 0 | DC |
| 1 | |
| 2 | |
| 3 | |
| 4 | |
| 5 | |
| 6 | |
| 7 | Pilot |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | Pilot |
| 22 | |
| 23 | |
| 24 | |
| 25 | |
| 26 | |
| 27 | Guard |
| 28 | Guard |
| 29 | Guard |
| 30 | Guard |
| 31 | Guard |

FIG. 8

| SC idx | Object |
|---|---|
| -32 | Guard |
| -31 | Guard |
| -30 | Guard |
| -29 | Guard |
| -28 | |
| -27 | |
| -26 | |
| -25 | |
| -24 | |
| -23 | |
| -22 | |
| -21 | Pilot |
| -20 | |
| -19 | |
| -18 | |
| -17 | |
| -16 | |
| -15 | |
| -14 | |
| -13 | |
| -12 | |
| -11 | |
| -10 | |
| -9 | |
| -8 | |
| -7 | Pilot |
| -6 | |
| -5 | |
| -4 | |
| -3 | |
| -2 | |
| -1 | |

| SC idx | Object |
|---|---|
| 0 | DC |
| 1 | |
| 2 | |
| 3 | |
| 4 | |
| 5 | |
| 6 | |
| 7 | Pilot |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | Pilot |
| 22 | |
| 23 | |
| 24 | |
| 25 | |
| 26 | |
| 27 | |
| 28 | |
| 29 | Guard |
| 30 | Guard |
| 31 | Guard |

FRAME TRANSMITTING METHOD AND FRAME RECEIVING METHOD

CROSS-REFERENCE TO RELATED APPLICATION

This application is a continuation of application Ser. No. 16/440,635, filed on Jun. 13, 2019, now U.S. Pat. No. 10,944,593, issued Mar. 9, 2021, which is a continuation of application Ser. No. 15/626,966, filed on Jun. 19, 2017, now U.S. Pat. No. 10,326,618, issued Jun. 18, 2019, which is a continuation of application Ser. No. 14/684,117, filed on Apr. 10, 2015, now U.S. Pat. No. 9,712,342, issued Jul. 18, 2017, which claims the benefit of U.S. Provisional Application No. 61/978,776, filed on Apr. 11, 2014 in the U.S. Patent and Trademark Office and priority to and the benefit of Korean Patent Application No. 10-2015-0047099, filed on Apr. 2, 2015 in the Korean Intellectual Property Office, the entire contents of which are incorporated herein by reference.

BACKGROUND

(a) Field

The described technology relates generally to a frame transmitting method and a frame receiving method. More particularly, the described technology relates generally to a frame transmitting method and a frame receiving method in a wireless local area network (WLAN).

(b) Description of the Related Art

A WLAN is being standardized by the IEEE (Institute of Electrical and Electronics Engineers) Part 11 under the name of "Wireless LAN Medium Access Control (MAC) and Physical Layer (PHY) Specifications." After an original standard was published on 1999, new version standards are continuously published by amendments. The IEEE standard 802.11a (IEEE Std 802.11a-1999) supporting 2.4 GHz band was published on 1999, and the IEEE standard 802.11g (IEEE Std 802.11g-2003) supporting 5 GHz band was published on 2003. These standards are called legacy. Subsequently, the IEEE standard 802.11n (IEEE Std 802.11n-2009) for enhancements for higher throughput (HT) was published on 2009, and the IEEE standard 802.11ac (IEEE 802.11ac-2013) for enhancements for very high throughput (VHT) was published on 2013. Recently, a high efficiency WLAN (HEW) for enhancing the system throughput in high density scenarios is being developed by the IEEE 802.11ax task group.

In a new version WLAN, signaling information with which a transmitting device provides a receiving device may be increased compared with the previous WLAN. In this case, a scheme for providing additional signaling information with maintaining the backward compatibility with the previous WLAN is required.

SUMMARY

An embodiment of the present invention provides a frame transmitting method and a frame receiving method for providing additional signaling information with maintaining the backward compatibility with the previous WLAN.

According to another embodiment of the present invention, a method of transmitting a frame is provided by a device in a WLAN. The method includes generating a legacy short training field, a legacy long training field, a legacy signal field, and a data field of a legacy frame format, allocating predetermined information to additional data subcarriers that are some of subcarriers which are not set as data subcarriers at the legacy frame format, in at least one field among the legacy short training field, the legacy long training field, the legacy signal field, and the data field, and transmitting a frame including the legacy short training field, the legacy long training field, the legacy signal field, the data field, and the predetermined information.

The at least one field may include the data field.

The at least one field may further include the legacy signal field.

The additional data subcarriers may include some of subcarriers that are used as guards in the legacy frame format.

The additional data subcarriers may include subcarriers whose indices −28, −27, 27, and 28 on a 20 MHz bandwidth basis.

The additional data subcarriers on a symbol of a plurality of symbol included in the at least one field may be used as a long training field for channel estimation.

When M additional data subcarriers are used in each of N symbols of the at least one field, the predetermined information may be allocated by a predetermined M×N matrix pattern.

The frame may be a request to send (RTS) frame or a clear to send (CTS) frame.

The predetermined information may include information on a bandwidth which the device uses.

The frame may further include an indication indicating whether the frame is in a mode using an additional data subcarrier.

A predetermined bit of the legacy signal field may include the indication.

A predetermined bit of the first 7 bits in a scrambling sequence for scrambling the data field may include the indication.

The data field may include a service field, and the first 7 bits of the service field may correspond to the first 7 bits of a scrambling sequence. A predetermined bit of the first 7 bits in the scrambling sequence may include the indication.

The data field may include a service field, and a predetermined bit of the eighth to sixteenth bits in the service field may include the indication.

According to yet another embodiment of the present invention, a frame transmitting apparatus of a device is provided in a WLAN. The frame transmitting apparatus includes a processor and a transceiver. The processor generates a legacy short training field, a legacy long training field, a legacy signal field, and a data field of a legacy frame format. The processor allocates predetermined information to additional data subcarriers that are some of subcarriers which are not set as data subcarriers at the legacy frame format, in at least one field among the legacy short training field, the legacy long training field, the legacy signal field, and the data field. The transceiver transmits a frame including the legacy short training field, the legacy long training field, the legacy signal field, the data field, and the predetermined information.

According to still another embodiment of the present invention, a method of receiving a frame is provided by a device in a wireless communication network. The method includes receiving a frame of a legacy frame format including a legacy short training field, a legacy long training field, a legacy signal field, and a data field, and acquiring information from additional data subcarriers that are set by some of subcarriers which are not set as data subcarriers at the legacy frame format, in at least one field among the legacy short training field, the legacy long training field, the legacy signal field, and the data field.

The additional data subcarriers may include some of subcarriers that are used as guards in the legacy frame format.

The additional data subcarriers may include subcarriers whose indices −28, −27, 27, and 28 on a 20 MHz bandwidth basis.

The information may include information on a bandwidth which a device transmitting the frame uses.

The method may further include determining whether the frame is in a mode using an additional data subcarrier, based on an indication included in a predetermined bit of the frame.

The method may further include determining whether the frame is in a mode using an additional data subcarrier, by measuring a power of subcarriers that are not set as data subcarriers in the legacy frame format.

According to further embodiment of the present invention, a frame transmitting apparatus of a device is provided in a WLAN. The frame transmitting apparatus includes a processor and a transceiver. The transceiver receives a frame of a legacy frame format including a legacy short training field, a legacy long training field, a legacy signal field, and a data field. The processor acquires information from additional data subcarriers that are set by some of subcarriers which are not set as data subcarriers at the legacy frame format, in at least one field among the legacy short training field, the legacy long training field, the legacy signal field, and the data field.

BRIEF DESCRIPTION OF THE DRAWINGS

FIG. 7 exemplifies a subcarrier allocation of a 20 MHz transmission mode in a previous WLAN.

FIG. 8 exemplifies a subcarrier allocation in a wireless communication network according to an embodiment of the present invention.

DETAILED DESCRIPTION OF THE EMBODIMENTS

Figure 1:
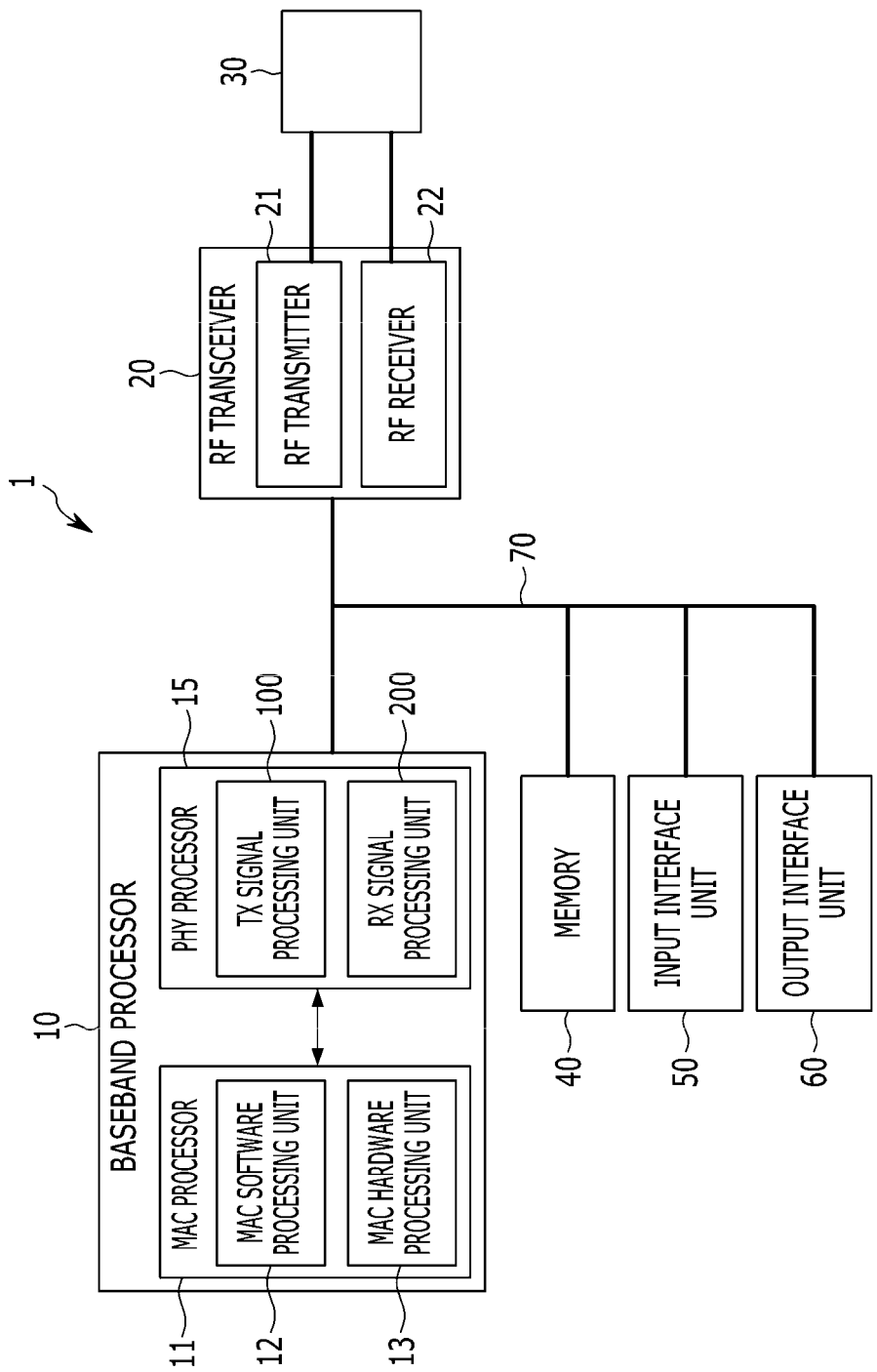
FIG. 1 is a schematic block diagram exemplifying a WLAN device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. The plurality of WLAN devices may include a WLAN device that is an access point and the other WLAN devices that are non-AP stations (non-AP STAs). Alternatively, all the plurality of WLAN devices may be non-AP STAs in Ad-hoc networking. In general, the AP STA and the non-AP STA may be collectively called the STA. However, for easy description, only the non-AP STA may be called the STA.

FIG. 1 is a schematic block diagram exemplifying a WLAN device.

Referring to FIG. 1, the WLAN device 1 includes a baseband processor 10, a radio frequency (RF) transceiver 20, an antenna unit 30, a memory 40, an input interface unit 50, an output interface unit 60, and a bus 70.

The baseband processor 10 performs baseband signal processing, and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, the MAC processor 11 is not limited to this.

The PHY processor 15 includes a transmitting signal processing unit 100 and a receiving signal processing unit 200.

The baseband processor 10, the memory 40, the input interface unit 50, and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
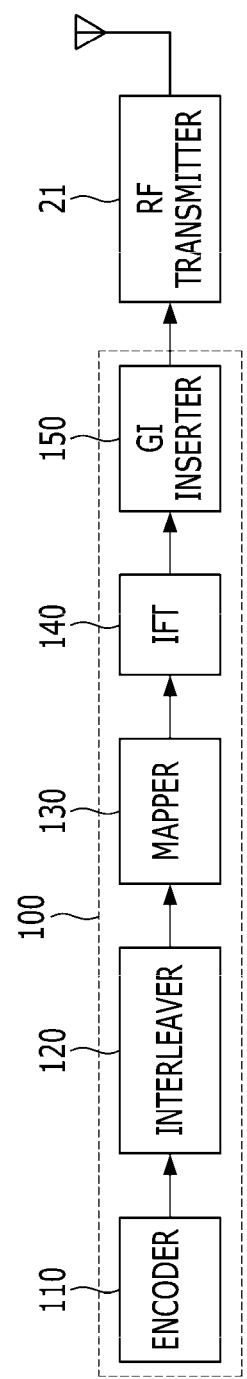
FIG. 2 is a schematic block diagram exemplifying a transmitting signal processor in a WLAN.

FIG. 2 is a schematic block diagram exemplifying a transmitting signal processor in a WLAN.

Referring to FIG. 2, a transmitting signal processing unit 100 includes an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers corresponding to the number of $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
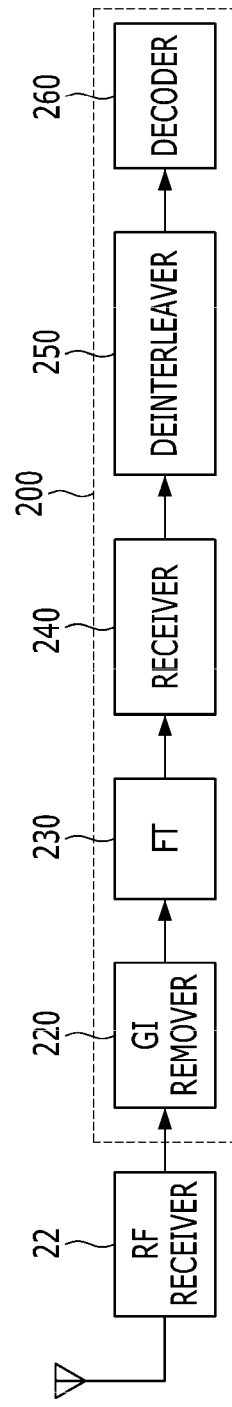
FIG. 3 is a schematic block diagram exemplifying a receiving signal processing unit in the WLAN.

FIG. 3 is a schematic block diagram exemplifying a receiving signal processing unit in the WLAN.

Referring to FIG. 3, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into the symbols. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may a spatial demapper for converting the Fourier transformed receiver chains to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
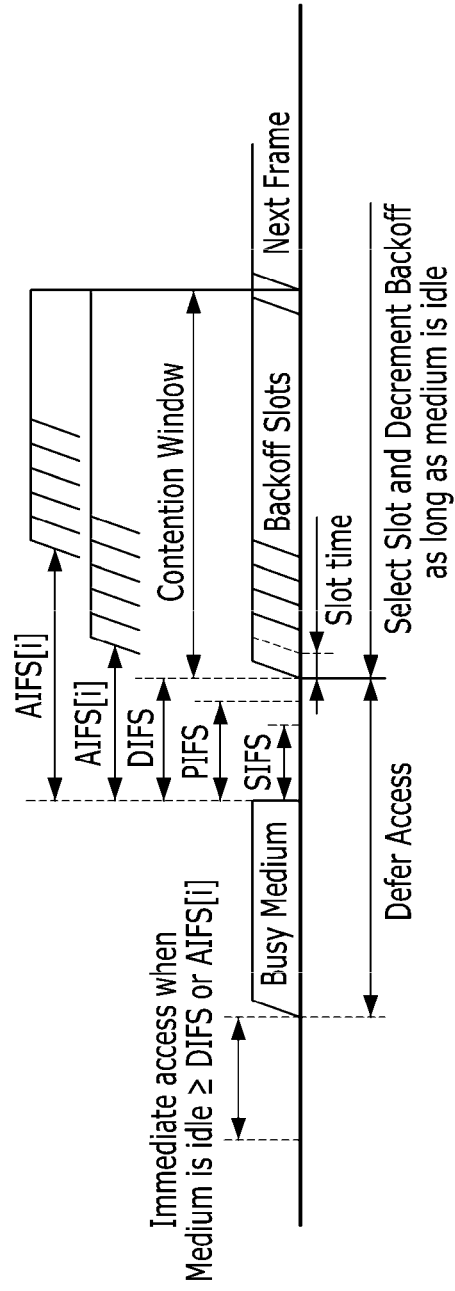
FIG. 4 exemplifies IFS relationships.

FIG. 4 exemplifies interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for access category (AC), i.e., AIFS[AC], has elapsed. In this case, the data frame, the management frame, or the control frame which is not the response frame may use the AIFC[AC].

Figure 5:
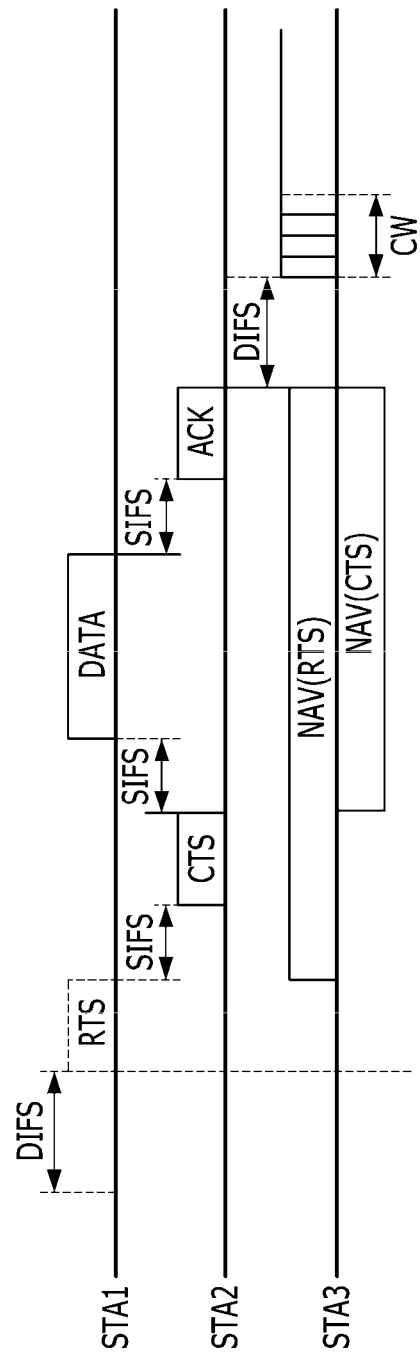
FIG. 5 is a schematic diagram explaining CSMA/CA based frame transmission procedure for avoiding collision between frames in a channel.

FIG. 5 is a schematic diagram explaining a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data, and STA3 is a WLAN device which may be located at an area where a frame transmitted from the STA and/or a frame transmitted from the STA2 can be received by the WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When determining that the channel is not used by other devices during DIFS (that is, the channel is idle), the STA1 may transmit an RTS frame to the STA2 after performing backoff. Upon receiving the RTS frame, the STA2 may transmit a CTS frame as a response of the CTS frame after SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, the STA3 may determine whether the channel is busy by the carrier sensing. Upon determining that the channel is not used by the other devices during DIFS after the NAV timer has expired, the STA3 may attempt the channel access after a contention window according to random backoff elapses.

Now, a signaling method in a wireless communication network according to various embodiments of the present invention is described with reference to the drawings. The wireless communication network according to various embodiments of the present invention may be a WLAN. Particularly, the wireless communication network according to various embodiments of the present invention may be a high efficiency WLAN (HEW) that is being developed by the IEEE 802.11ax task group among WLANs. Hereinafter, the wireless communication network according to various embodiments of the present invention is assumed as the WLAN, particularly the HEW, for convenience.

Figure 6:
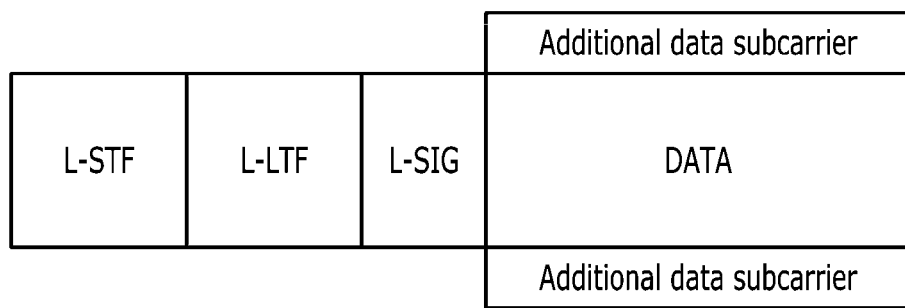
FIG. 6 exemplifies a frame format in a wireless communication network according to an embodiment of the present invention.

FIG. 6 exemplifies a frame format in a wireless communication network according to an embodiment of the present invention, FIG. 7 exemplifies a subcarrier allocation of a 20 MHz transmission mode in a previous WLAN, and FIG. 8 exemplifies a subcarrier allocation in a wireless communication network according to an embodiment of the present invention. It is assumed that the frame shown in FIG. 6 is a PHY frame, for example a physical layer convergence procedure (PLCP) frame and uses a channel with a basic bandwidth (for example, 20 MHz bandwidth). Further, the frame shown in FIG. 6 may be a request frame or a response frame on the request frame. An example of the request frame may be an RTS frame, and an example of the response frame may be a CTS frame.

Referring to FIG. 6, a frame includes a legacy short training field (L-STF), a legacy long training field (L-LTF), a legacy signal field (L-SIG), and a data field. The L-STF and the L-LTF may be used for synchronization and channel estimation. The L-SIG may include rate and length information of the data field. The L-STF and the L-LTF each include two symbols, i.e., orthogonal frequency division multiplexing (OFDM) symbols, and the L-SIG includes one symbol. The data field may include a service field, a MAC frame part, and tail bits, and may further include, if necessary, pad bits. As such, the request frame or response frame uses a legacy frame format defined in the legacy (IEEE 802.11a or IEEE 802.11g) WLAN for the backward compatibility with the previous WLAN.

In an embodiment of the present invention, among a plurality of subcarriers included in each symbol of the data field, M subcarriers are used as additional data subcarriers for carrying signaling information besides subcarriers that are allocated to data subcarriers in the previous WLAN. Here, M is an integer greater than or equal to one.

The number of subcarriers included in one symbol is determined by a size of a fast Fourier transform (FFT) that is used. As described above, the request frame or response frame uses the legacy frame format. In the legacy frame format, when an inverse Fourier transformer (140 of FIG. 2) of the transmitting device performs an inverse Fourier transform, 64 FFT is used on a 20 MHz bandwidth basis. Accordingly, one symbol of the frame shown in FIG. 6 includes 64 subcarriers. In the legacy frame format, 64 subcarriers include one subcarrier used as a DC (direct current) subcarrier, four subcarriers used as pilots, and eleven subcarriers used as guards. Accordingly, 48 subcarriers among the 64 subcarriers are used as data subcarriers. As exemplified in FIG. 7, when a subcarrier index of the DC is 0, tones whose subcarrier indices are −21, −7, 7, and 21 may be used as the pilots, and some tones (i.e., tones whose subcarrier indices are −32 to −27 and 27 to 31) of both ends with the DC as the center may be used as the guards.

In some embodiments, as shown in FIG. 8, negative subcarriers whose indices are −28 and −27 and positive subcarriers whose indices are 27 and 28 among the 64 subcarriers may be used as the additional data subcarriers in replace of the guards among the 64 subcarriers. Accordingly, four subcarriers in one symbol can be used as the additional data subcarriers. In another embodiment, M subcarrier, where M is different from four, may be used as the additional data subcarriers.

As described above, since subcarriers which have not been used as the data subcarrier in the previous WLAN are used as the additional data subcarrier in the data field of the request frame or response frame, signaling information can be carried through the additional data subcarriers.

Since the additional data subcarriers correspond to the guards of the previous WLAN, the previous WLAN device, for example a legacy device, an HT device, or a VTH device determines the additional data subcarrier as the guards and does not demodulate or use the additional data subcarriers. However, a HEW device can determine the additional data subcarriers as the data subcarriers and interpret the additional data subcarriers. Accordingly, additional signaling information can be transmitted with maintaining the backward compatibility with the previous WLAN.

Figure 9:
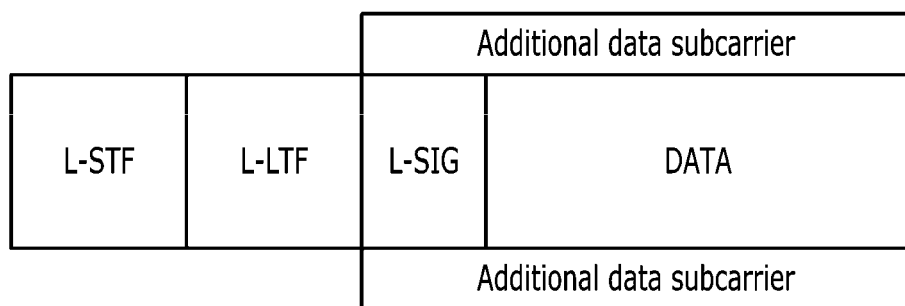
FIG. 9, FIG. 10, and FIG. 11 exemplify a frame format in a wireless communication network according to various embodiments of the present invention.
Figure 10:
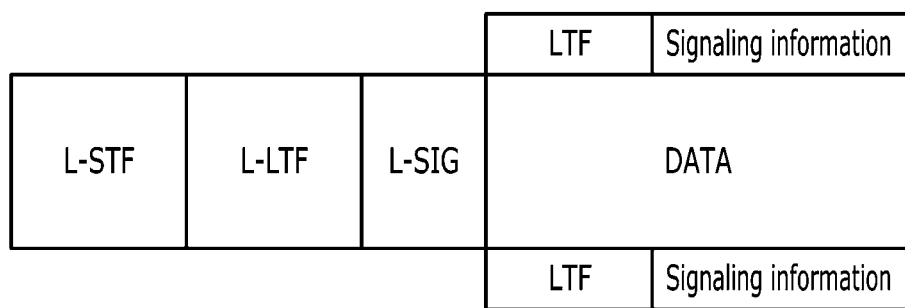
Figure 11:
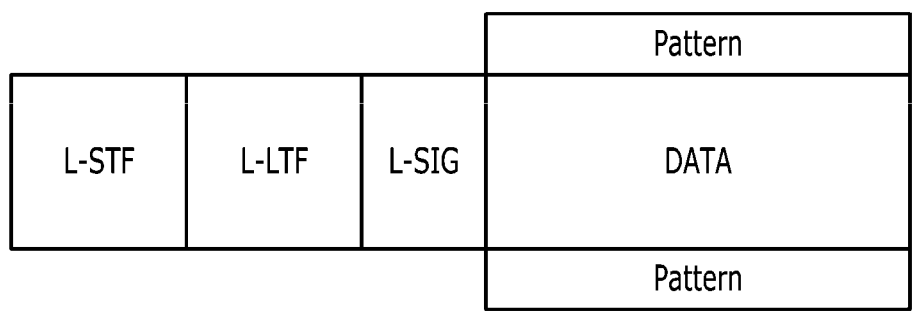

FIG. 9, FIG. 10, and FIG. 11 exemplify a frame format in a wireless communication network according to other embodiments of the present invention.

Referring to FIG. 9, in some embodiments, additional data subcarriers may be used in the L-SIG as well as the data field. Then, the additional data subcarriers corresponding to the L-SIG, i.e., one symbol can be additionally used.

In another embodiment, the additional data subcarriers may not be used in the data field and may be used only in the L-SIG. In yet another embodiment, the additional data subcarriers may be used in at least part of the L-STF, the L-LTF, the L-SIG, and the data field.

Referring to FIG. 10, in some embodiments, a transmitting device may code and modulate information that is transferred by additional data subcarriers in the same manner as information that is transferred by other data subcarriers. In this case, a part of the additional data subcarriers may be used as a long training field (LTF) for channel estimation on the additional data subcarriers. For example, the additional data subcarriers corresponding to two symbols may be used as the LTF for the channel estimation like the L-LTF.

Accordingly, a receiving device can estimate a channel corresponding to the additional data subcarriers based on the LTF.

Referring to FIG. 11, in some embodiments, signaling information that is transferred by additional data subcarriers may be provided in a form of predetermined pattern. For example, when additional data subcarriers are used in N symbols and four subcarriers are assigned to the additional data subcarriers in one symbol, the signaling information may be transmitted in a pattern of 4×N matrix. For example, patterns of a predetermined number may be defined, and each pattern may be assigned predetermined information. Accordingly, a receiving device can acquire information provided by the transmitting device, based on the pattern formed by the 4×N matrix that is defined by the additional data subcarriers of the received frame.

For example, the patterns of the predetermined number may be defined by using 1 and −1 as in Equation 1. Alternatively, the patterns of the predetermined number may be defined by using j and −j.

$$\left\{\begin{matrix} 1 & 1 & 1 & 1 & \cdots & 1 & 1 \\ 1 & 1 & 1 & 1 & \cdots & 1 & 1 \\ 1 & 1 & 1 & 1 & \cdots & 1 & 1 \\ 1 & 1 & 1 & 1 & \cdots & 1 & 1 \end{matrix}\right\}, \left\{\begin{matrix} 1 & -1 & 1 & -1 & \cdots & 1 & -1 \\ 1 & 1 & 1 & 1 & \cdots & 1 & 1 \\ 1 & -1 & 1 & -1 & \cdots & 1 & -1 \\ 1 & 1 & 1 & 1 & \cdots & 1 & 1 \end{matrix}\right\}, \cdots$$

$$\left\{\begin{matrix} 1 & 1 & -1 & -1 & \cdots & -1 & -1 \\ 1 & 1 & 1 & 1 & \cdots & 1 & 1 \\ 1 & 1 & 1 & 1 & \cdots & 1 & 1 \\ 1 & -1 & 1 & -1 & \cdots & 1 & -1 \end{matrix}\right\}$$

Equation 1

In some embodiments, matrix patterns of a predetermined number, for example four matrix patterns which have the greatest difference in Frobenius norm from among various matrix patterns may be used.

As such, when the signaling information to be transferred by the additional data subcarriers is provided by the predetermined pattern, the receiving device can interpret the signaling information even if failing to estimate the channel. Further, even though the transmitting device transmits the signaling information on the additional data subcarriers without coding and/or modulating the signaling information, the receiving device can interpret the signaling information based on the pattern.

Next, a method where a transmitting device notifies whether a frame is transmitted by using additional data subcarriers is described.

FIG. 12, FIG. 13, FIG. 14, and FIG. 15 exemplify a method for detecting a frame format in a wireless communication network according to various embodiments of the present invention.

Figure 12:
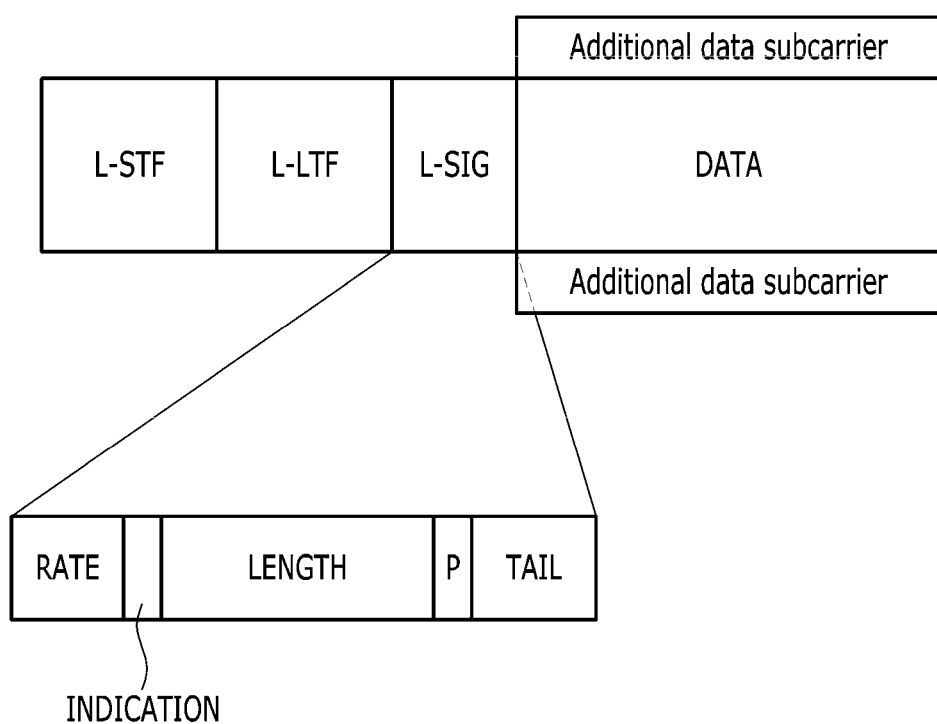
FIG. 12, FIG. 13, FIG. 14, and FIG. 15 exemplify a method for detecting a frame format in a wireless communication network according to various embodiments of the present invention.

Referring to FIG. 12, an L-SIG includes a rate field, a reserved bit, and a length field. The rate field has 4 bits and the length field has 12 bits. A pad bit of 1 bit and tail bits of 6 bits are added after the length field. In some embodiments, the reserved 1 bit of the L-SIG is used as an indication indicating whether a frame is in a mode using an additional data subcarrier.

Accordingly, a HEW device can interpret information of the additional data subcarrier when the indication of the L-SIG indicates the mode using the additional data subcarrier.

Figure 13:
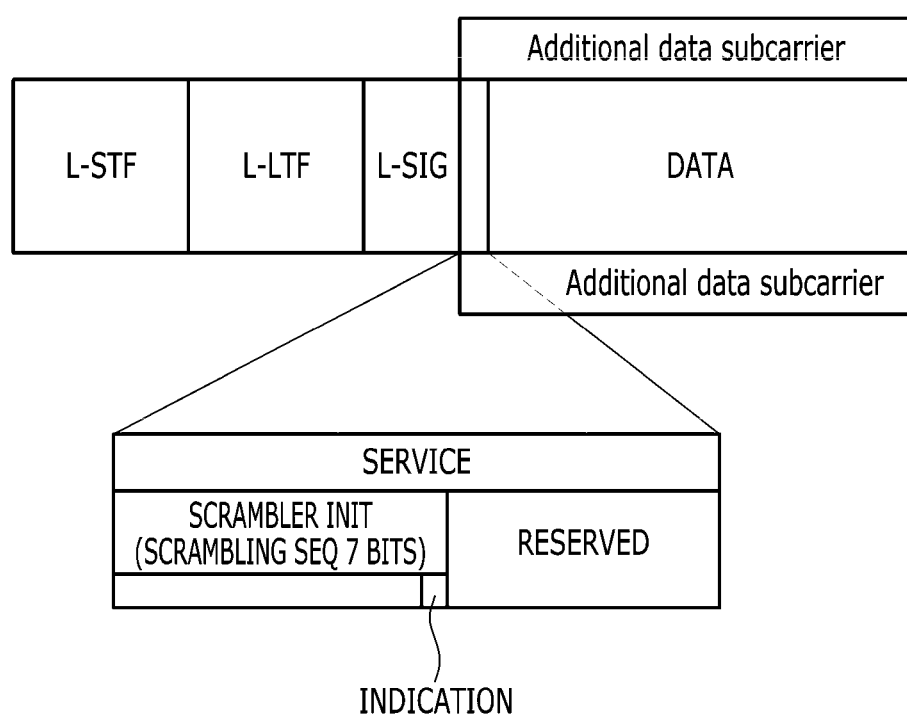

Referring to FIG. 13, a data field includes a service field. The service field corresponds to the first 16 bits of the data field, and the first 7 bits of the service field correspond to scrambler initialization bits. The scrambler initialization bits may be used to synchronize a descrambler and may be set to zero to enable estimation of an initial state of a scrambler in a receiver. The remaining 9 bits are reserved and may be set to zero.

A scrambler of a transmitting device generates a scrambling sequence by repeatedly generating a 127-bit sequence from a 7-bit scrambler seed. Accordingly, the scrambler seed is one-to-one mapped to the first 7 bits of the scrambling sequence. Since the scrambler initialization bits are set to "0000000," the first 7 bits of data that are outputted by scrambling the data field before being scrambled are equal to the first 7 bits of the scrambling sequence. Therefore, a receiving device can determine the first 7 bits of the data field in the received frame as the scrambler seed and generate the same scrambling sequence as a transmitting device such that it can descramble the data field.

In some embodiments, a part of the first 7 bits in the scrambler seed, i.e., the scrambler sequence is used as an indication indicating whether an additional data subcarrier is used. Since the first 7 bits of the service field, i.e., the first 7 bits of the data field are equal to the first 7 bits of the scrambler sequence, the receiving device can detect whether the additional data subcarrier is used based on the bit that corresponds to the indication among the first 7 bits of the data field.

Figure 14:
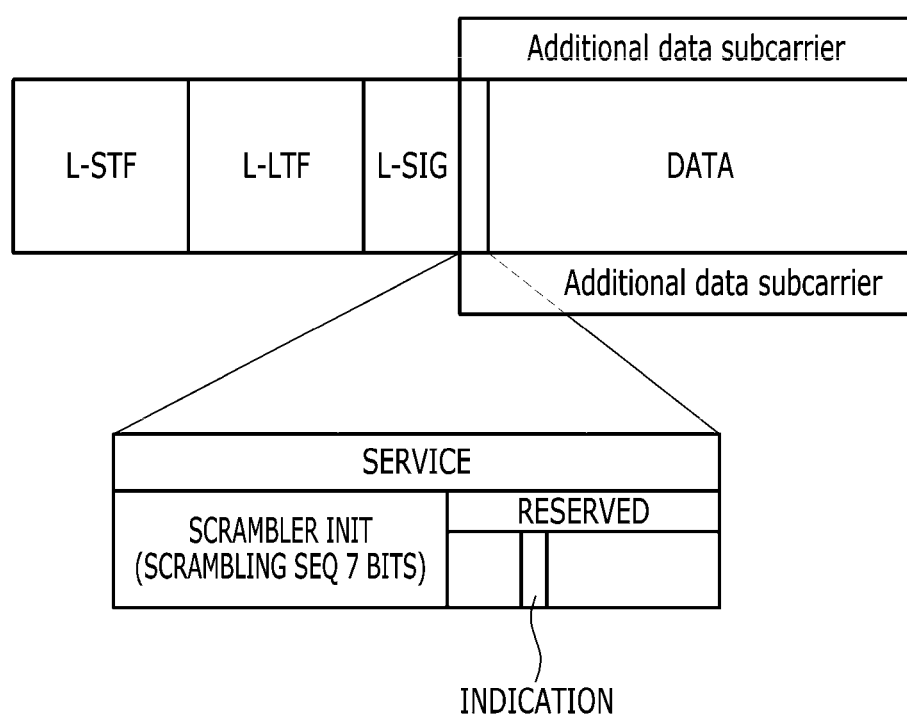

In another embodiment, as shown in FIG. 14, a part of the reserved bits of the service field may be used as the indication.

Figure 15:
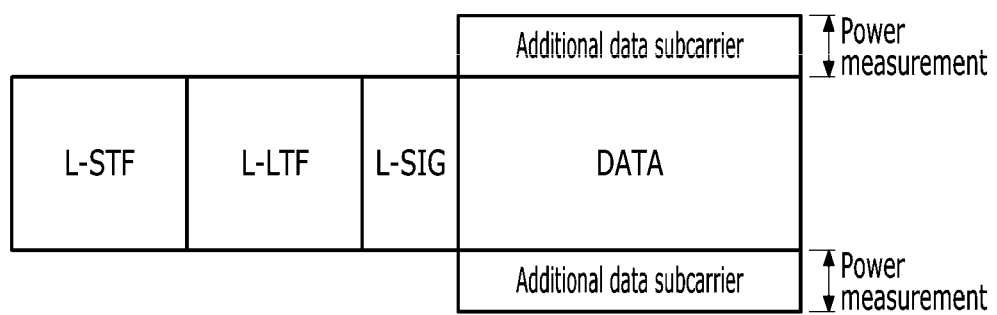

Referring to FIG. 15, in some embodiments, a receiving device may determine whether signaling information is transmitted by an additional data subcarrier, based on a power of a subcarrier corresponding to the additional data subcarrier in a field to which the additional data subcarrier is applied. Since the subcarrier corresponding to the additional data subcarrier is used as a guard in the previous WLAN, the power is not measured on that subcarrier. However, since the power is measured when the signaling information is transmitted by the additional data subcarrier, the receiving device can automatically detect a frame format by measuring the power.

While a channel with a basic bandwidth (for example, a 20 MHz bandwidth) has been described above, an additional data subcarrier may be used in a channel with a multi-bandwidth. Hereinafter, these embodiments are described with reference to FIG. 16 and FIG. 17.

Figure 16:
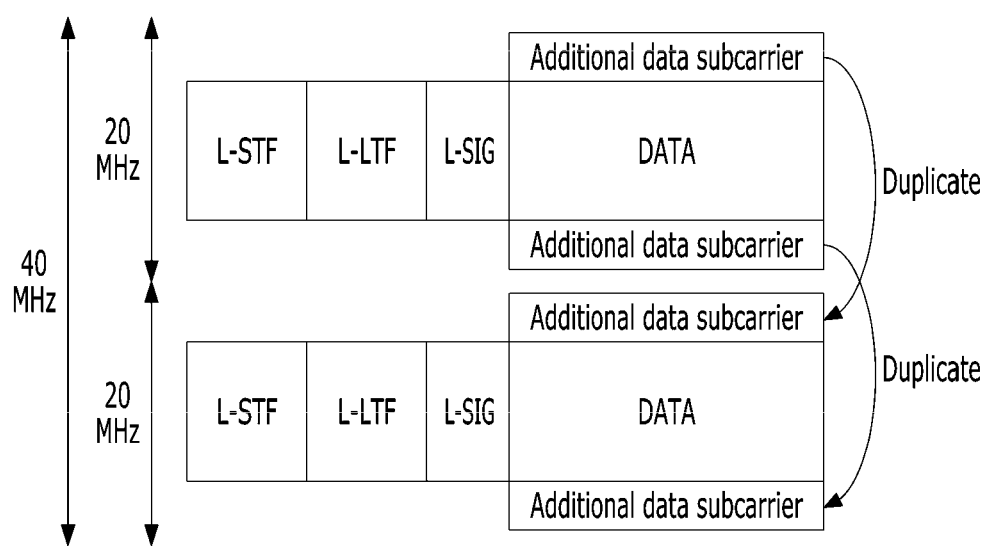
FIG. 16 and FIG. 17 exemplify a frame format at a multi-bandwidth in a wireless communication network according to various embodiments of the present invention.
Figure 17:
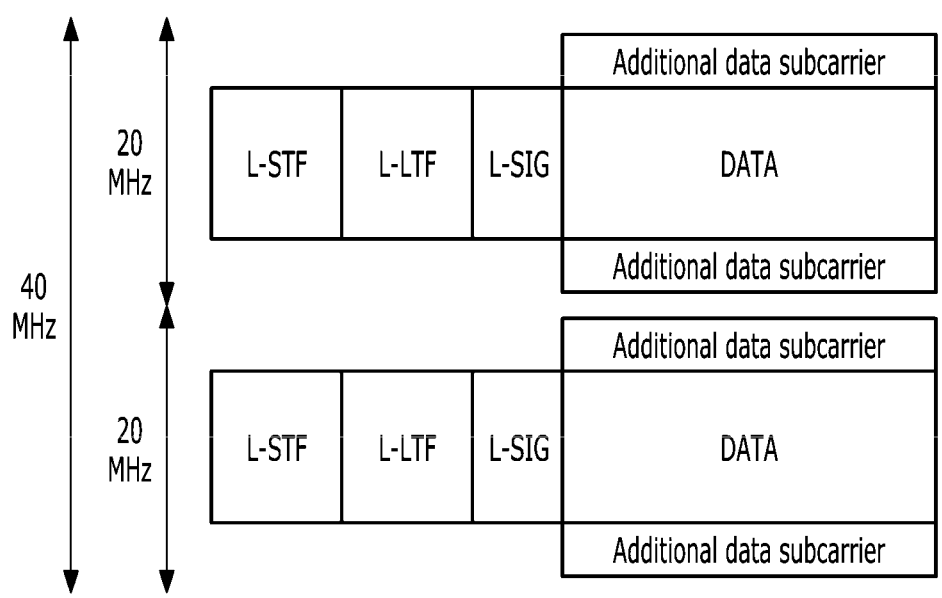

FIG. 16 and FIG. 17 exemplify a frame format at a multi-bandwidth in a wireless communication network according to other embodiments of the present invention. It is assumed in FIG. 16 and FIG. 17 that a multi-bandwidth is 40 MHz bandwidth for convenience.

Referring to FIG. 16, a request frame or response frame is transmitted by repeating the basic bandwidth (for example, a 20 MHz bandwidth). That is, each field of one basic bandwidth is duplicated to other basic bandwidth. Because a legacy device can interpret a frame of the basic bandwidth, the request frame or response frame that is transmitted by repeating the basic bandwidth can maintain the compatibility with an HT device and a VHT device as well as the legacy device.

In some embodiments, data on an additional data subcarrier of one basic bandwidth are duplicated to an additional data subcarrier of other basic bandwidth.

In some embodiments, as shown in FIG. 17, a basic bandwidth may be not duplicated. In one embodiment, as described with reference to FIG. 10, signaling information that is different from signaling information transmitted by an additional data subcarrier of one basic bandwidth may be transmitted by an additional data subcarrier of the other basic bandwidth. In another embodiment, as described with reference to FIG. 11, a pattern may be defined by additional data subcarriers of a plurality of basic bandwidths. For example, when four additional data subcarriers are used for each symbol in the 20 MHz bandwidth, 8×N matrix patterns may be defined in 40 MHz bandwidth. In this case, since a lot of patterns can be defined, a large amount of information can be transmitted.

While it has been described in FIG. 16 and FIG. 17 that the 40 MHz bandwidth is one example of the multi-bandwidth, an additional data subcarrier may be applied to a channel with the different bandwidth as described with reference to FIG. 16 or FIG. 17.

Next, an example of signaling information to be transmitted by an additional data subcarrier is described.

Figure 18:
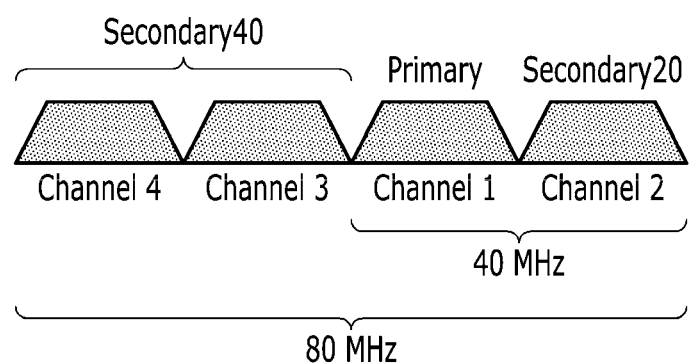
FIG. 18 shows an example of a channel width used in a wireless communication network according to an embodiment of the present invention.
Figure 19:
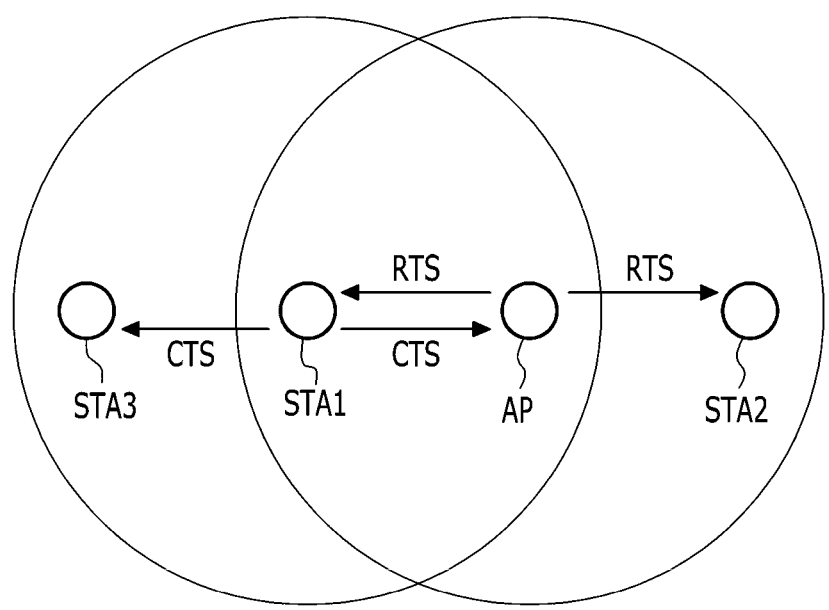
FIG. 19 and FIG. 20 are drawings explaining an exchange of an RTS frame and a CTS frame in a wireless communication network according to an embodiment of the present invention.
Figure 20:
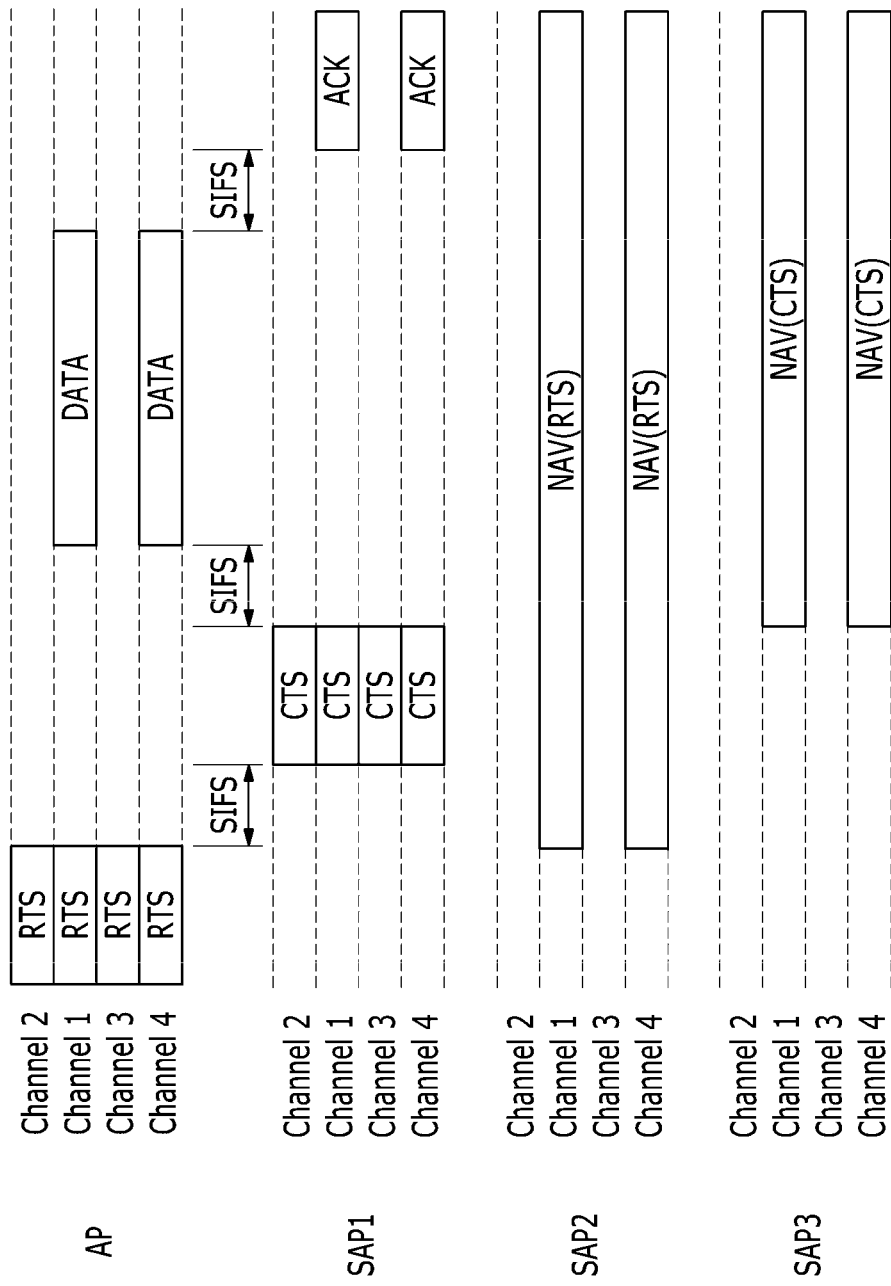

FIG. 18 shows an example of a channel width used in a wireless communication network according to an embodiment of the present invention, and FIG. 19 and FIG. 20 are drawings explaining an exchange of an RTS frame and a CTS frame in a wireless communication network according to an embodiment of the present invention.

The previous WLAN supports contiguous channels but does not support non-contiguous channels when using a multi-bandwidth. For example, as shown in FIG. 18, an 80 MHz channel width in a VHT WLAN may be divided into a primary channel (primary) having a 20 MHz bandwidth (hereinafter referred to as a "primary 20 MHz channel), a secondary channel (secondary 20) having a 20 MHz bandwidth (hereinafter referred to as a "secondary 20 MHz channel), and a secondary channel (secondary 40) having a 40 MHz bandwidth (hereinafter referred to as a "secondary 40 MHz channel). A VHT device uses the primary 20 MHz channel for a transmission of the 20 MHz bandwidth, the primary 20 MHz channel and the secondary 20 MHz channel for a transmission of the 40 MHz bandwidth, and the primary 20 MHz channel, the secondary 20 MHz channel and the secondary 40 MHz channel for a transmission of the 80 MHz bandwidth. As such, the VHT device uses a multi-channel by always using the other adjacent secondary channel together with the primary 20 MHz channel.

However, in a wireless communication network according to an embodiment of the present invention, a HEW device can use the secondary channel independently from the primary channel, and can divide and use the secondary 40 MHz channel into 20 MHz bandwidths. For the independent use of the secondary channel, for example an orthogonal frequency division multiple access (OFDMA) scheme may be used.

In this case, as shown in FIG. 19 and FIG. 20, when a transmitting device AP has data to be transmitted to a receiving device STA1, the transmitting device AP transmits a request frame, for example an RTS frame, to notify this. It is assumed that the transmitting device AP transmits the data by using the primary 20 MHz channel (channel 1) and a channel (channel 40) with a 20 MHz bandwidth in the secondary 40 MHz channel. For the compatibility with the previous WLAN that does not support the non-contiguous channels, the transmitting device AP transmits the RTS frame by duplicating an RTS frame of the 20 MHz bandwidth to the entire 80 MHz channel.

A device STA1 that corresponds to an address set to a receiver address (RA) field of the RTS frame transmits a response frame, for example a CTS frame, as a response of the RTS frame after an SIFS interval. The receiving device STA1 transmits the CTS frame by duplicating a CTS frame of the 20 MHz bandwidth to the entire 80 MHz channel. Further, the receiving device STA transmits the CTS frame by copying an address set to a transmitter address (TA) of the RTS frame to an RA field of the CTS frame.

The transmitting device AP receiving the CTS frame transmits to the receiving device STA1 a data frame on channels (for example, channel 1 and channel 4) of assigned bandwidths data frame after the SIFS interval. The device STA1 receiving the data frame transmits to the transmitting device AP an ACK frame on channels (for example, channel 1 and channel 4) of the assigned bandwidths after the SIFS interval.

In the previous WLAN, other device STA2 receiving the RTS frame updates a NAV based on a duration field of the RTS frame, and other device STA3 receiving the CTS frame updates a NAV based on a duration field of the CTS frame. Accordingly, the devices STA2 and STA3 cannot use the entire 80 MHz channel in accordance with the NAV while the transmitting device AP and the receiving device STA1 exchange the data frame and the ACK frame.

In some embodiments, when the RTS frame and the CTS frame are transmitted, an additional data subcarrier carries information on a bandwidth which the device uses. Accordingly, when the devices STA2 and STA3 are the HEW devices, they can interpret information carried by the additional data subcarrier of the RTS frame or CTS frame, thereby detecting a bandwidth which the transmitting device AP and the receiving device STA1 do not use. Then, the devices STA2 and STA3 can transmit or receive frames through channels (for example, channel 2 and channel 3) with bandwidths that are not used.

The legacy device, the HT device, or the VHT device cannot use the entire 80 MHz bandwidth because it cannot interpret the information carried by the additional data subcarrier.

As such, if information on the used bandwidth is provided through the additional data subcarrier, frequency resources can be efficiently used.

In another embodiment, other signaling information may be transferred by an additional data subcarrier. The signaling information may include for example at least part of frame type information, identifier related information, multi-user (MU) related information, transmission mode information such as OFDM or OFDMA, resource allocation information, power saving information, calibration information, dynamic clear channel assessment (CCA) information, and interference information. The identifier related information may include a BSS identifier (BSSID), a partial association identifier (PAID), and/or a group ID. The calibration information may include information for calibrating a power, timing, and/or a frequency. The signaling information may further include information associated with transmission or reception between a transmitting device and receiving device.

Figure 21:
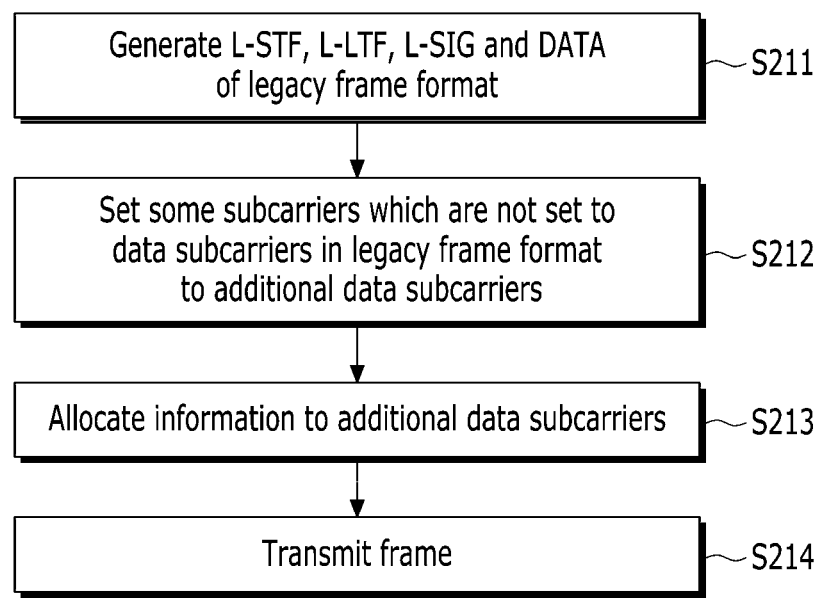
FIG. 21 is a flowchart exemplifying a frame transmitting method in a device of a wireless communication network according to an embodiment of the present invention.
Figure 22:
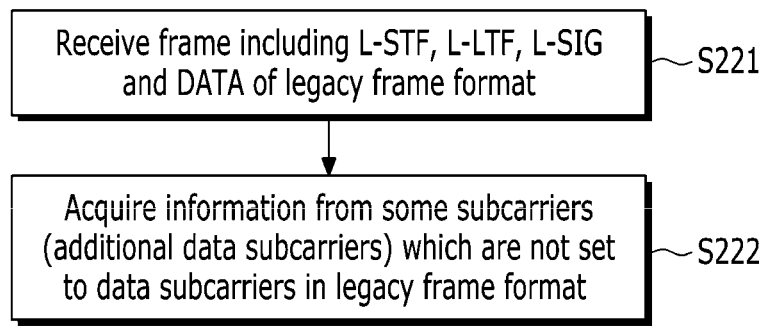
FIG. 22 is a flowchart exemplifying a frame receiving method in a device of a wireless communication network according to an embodiment of the present invention.

FIG. 21 is a flowchart exemplifying a frame transmitting method in a device of a wireless communication network according to an embodiment of the present invention and FIG. 22 is a flowchart exemplifying a frame receiving method in a device of a wireless communication network according to an embodiment of the present invention.

Referring to FIG. 21, a transmitting device generates a legacy short training field (L-STF), a legacy long training field (L-LTF), a legacy signal field (L-SIG), and a data field of a legacy frame format to transmit a request frame or response frame (S211). The data field includes a MAC frame part of the request frame or response frame. The transmitting device sets some of subcarriers that are not set as data subcarriers in the legacy frame format as additional data subcarriers in at least part of the L-STF, the L-LTF, the L-SIG, and the data field (S212). Further, the transmitting device allocates information, for example signaling information, to the additional data subcarriers (S213).

While the steps S211, S212, and S213 have been sequentially shown in FIG. 21, the steps S211, S212, and S213 may be performed in the different order or at the same time.

Next, the transmitting device transmits a frame including the L-STF, the L-LTF, the L-SIG, the data field, and the information allocated to the additional data subcarrier (S214).

Referring to FIG. 22, a receiving device receives a frame including a legacy short training field (L-STF), a legacy long training field (L-LTF), a legacy signal field (L-SIG), and a data field of a legacy frame format (S221). The data field includes a MAC frame part of the request frame or response frame. The receiving device acquires information, for example signaling information from additional data subcarriers that are set by some of subcarriers which are not set as data subcarriers in the legacy frame format, in at least part of the L-STF, the L-LTF, the L-SIG, and the data field (S222).

The receiving device may determine whether the receiving frame is in a mode using an additional data subcarrier, based on an indication included in a predetermined bit of the received frame. Alternatively, the receiving device may determine whether the receiving frame is in a mode using an additional data subcarrier, by measuring a power of subcarriers that are not set as data subcarrier in the legacy frame format.

A frame transmitting method and a frame receiving method according to above embodiments of the present invention may be executed by a baseband processor 10 shown in FIG. 1 to FIG. 3. In one embodiment, instructions for executing the frame transmitting method and the frame receiving method according to above embodiments of the present invention may be stored in a recording medium such as a memory 40. In another embodiment, at least some of the instructions may be MAC software. In yet another embodiment, at least some of the instructions may be transmitted from a recording medium of a certain server and may be stored in the memory 40.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Further, two or more embodiments may be combined.

What is claimed is:

1. A wireless device for receiving a first frame in a wireless network, the wireless device comprising:
 a set of processors; and
 a set of memory units that store instructions, which when executed by the set of processors cause the wireless device to:
 process a first set of symbols of a first legacy signal field of the first frame received in the wireless network, wherein the first set of symbols include (1) a first set of subcarriers that represent signaling information associated with the first frame and (2) a second set of subcarriers that represent first channel estimation information,
 wherein the signaling information of the first set of subcarriers include rate and length information associated with the first frame,
 wherein the first channel estimation information of the second set of subcarriers represent a predetermined pattern and have each been set to a value of −1 or 1 to form the predetermined pattern, and
 wherein the first set of subcarriers includes subcarriers with indices −26 through 26, excluding a direct current subcarrier at an index of 0 and pilot tone subcarriers at indices −21, −7, 7, and 21, and
 process a second set of symbols of the first frame, which include the first set of subcarriers.

2. The wireless device of claim 1, wherein the first frame is of a first format that includes the first set of subcarriers and the second set of subcarriers being present in the first set of symbols for the first legacy signal field,
 wherein the wireless device is capable of receiving a second frame of a second format, which includes a second legacy signal field that consists of the first set of subcarriers.

3. The wireless device of claim 2, wherein the instructions, when executed by the set of processors, further cause the wireless device to:
 determine that the first frame is of the first format or the second format based on the signaling information of the first legacy signal field.

4. The wireless device of claim 1, wherein the second set of symbols represent a data field of the first frame.

5. The wireless device of claim 1, wherein the second set of symbols represent a legacy long training field of the first frame that includes second channel estimation information.

6. The wireless device of claim 5, wherein the second set of symbols includes subcarriers with indices of −28, −27, 27 and 28 that are used as guard tones and a subcarrier with the index of 0 as the direct current subcarrier.

7. The wireless device of claim 5, wherein the second set of symbols of the legacy long training field immediately precede the first set of symbols of the legacy signal field in the first frame.

8. The wireless device of claim 7, wherein a number of symbols included in the first set of symbols is one.

9. The wireless device of claim 1, wherein a combined duration of the first set of symbols is identical to a combined duration of the second set of symbols.

10. The wireless device of claim 1, wherein a first half of the first set of subcarriers are located on one side of the direct current subcarrier and a second half of the first set of subcarriers are located on an opposite side of the direct current subcarrier.

11. The wireless device of claim 1, wherein a modulation and coding scheme used for the first number of subcarriers is identical to a modulation and coding scheme used for the second number of subcarriers.

12. A wireless device for transmitting a first frame in a wireless network, the wireless device comprising:
   a set of processors; and
   a set of memory units that store instructions, which when executed by the set of processors cause the wireless device to:
   generate a first set of symbols of a first legacy signal field of the first frame, wherein the first set of symbols include (1) a first set of subcarriers that represent signaling information associated with the first frame and (2) a second set of subcarriers that represent first channel estimation information,
   wherein the signaling information of the first set of subcarriers include rate and length information associated with the first frame,
   wherein the first channel estimation information of the second set of subcarriers represent a predetermined pattern and have each been set to a value of −1 or 1 to form the predetermined pattern, and
   wherein the first set of subcarriers includes subcarriers with indices −26 through 26, excluding a direct current subcarrier at an index of 0 and pilot tone subcarriers at indices −21, −7, 7, and 21,
   generate a second set of symbols of the first frame, which include the first set of subcarriers, and
   transmit the first frame in the wireless network.

13. The wireless device of claim 12, wherein the first frame is of a first format that includes the first set of subcarriers and the second set of subcarriers being present in the first set of symbols for the first legacy signal field,
   wherein the wireless device is capable of transmitting a second frame of a second format, which includes a second legacy signal field that consists of the first set of subcarriers.

14. The wireless device of claim 13, wherein the instructions, when executed by the set of processors, further cause the wireless device to:
   set the first legacy signal field to indicate that the first frame is of the first format instead of the second format.

15. The wireless device of claim 12, wherein the second set of symbols represent a data field of the first frame.

16. The wireless device of claim 12, wherein the second set of symbols represent a legacy long training field of the first frame that includes second channel estimation information.

17. The wireless device of claim 16, wherein the second set of symbols includes subcarriers with indices of −28, −27, 27 and 28 that are used as guard tones and a subcarrier with the index of 0 as the direct current subcarrier.

18. The wireless device of claim 16, wherein the second set of symbols of the legacy long training field immediately precede the first set of symbols of the legacy signal field in the first frame.

19. The wireless device of claim 12, wherein a combined duration of the first set of symbols is identical to a combined duration of the second set of symbols.

20. The wireless device of claim 12, wherein a first half of the first set of subcarriers are located on one side of the direct current subcarrier and a second half of the first set of subcarriers are located on an opposite side of the direct current subcarrier.

* * * * *